(12) United States Patent
Hwu et al.

(10) Patent No.: US 6,640,315 B1
(45) Date of Patent: Oct. 28, 2003

(54) METHOD AND APPARATUS FOR ENHANCING INSTRUCTION LEVEL PARALLELISM

(75) Inventors: Wen-mei W. Hwu, Champaign, IL (US); Daniel A. Connors, Champaign, IL (US); David I. August, Champaign, IL (US); John W. Sias, Champaign, IL (US)

(73) Assignee: Board of Trustees of the University of Illinois, Urbana, IL (US)

( * ) Notice: Subject to any disclaimer, the term of this patent is extended or adjusted under 35 U.S.C. 154(b) by 0 days.

(21) Appl. No.: 09/344,909

(22) Filed: Jun. 26, 1999

(51) Int. Cl.[7] ................................................. G06F 11/14
(52) U.S. Cl. ......................................... 714/17; 712/244
(58) Field of Search .............................. 714/17, 16, 38, 714/49, 50, 51; 712/237, 239, 244

(56) References Cited

U.S. PATENT DOCUMENTS

| | | | |
|---|---|---|---|
| 5,596,733 A | 1/1997 | Worley, Jr. et al. ......... | 395/591 |
| 5,692,169 A | 11/1997 | Kathail et al. ............... | 395/591 |
| 5,694,577 A | 12/1997 | Kiyohara et al. ........... | 395/591 |
| 5,778,219 A * | 7/1998 | Amerson et al. ........... | 395/591 |
| 5,799,167 A * | 8/1998 | Lesartre ....................... | 395/394 |
| 5,859,999 A | 1/1999 | Morris et al. ................ | 395/565 |
| 5,860,017 A | 1/1999 | Sharangpani et al. ... | 395/800.23 |
| 5,881,280 A * | 3/1999 | Gupta et al. ................. | 395/591 |
| 5,987,588 A * | 11/1999 | Popescu et al. ............... | 712/23 |
| 6,247,121 B1 * | 6/2001 | Akkary et al. ............... | 712/239 |
| 6,321,328 B1 * | 11/2001 | Karp et al. ................... | 712/225 |
| 2002/0010851 A1 * | 1/2002 | Morris et al. ................ | 712/244 |

OTHER PUBLICATIONS

R.A. Bringmann, S.A. Mahlke, R.E. Hank, J.C. Gyllenhaal, and W.W. Hwu. Speculative execution exception recovery using write–back suppression. In Proceedings of 26th Annual Int'l Symposium on Microarchitecture, Dec. 1993.

D.M. Gallagher, W.Y. Chen, S.A. Mahlke, J.C. Gyllenhaal, and W.W. Hwu. Dynamic memory disambiguation using the Memory Conflict Buffer. In Proceedings of 6th Int'l Conference on Architectural Support for Programming and Operating Systems, pp. 183–193, Oct. 1994.

M.D. Smith, M.S. Lam, and M.A. Horowitz. Boosting beyond static scheduling in a superscalar processor. In proceedings of the 17th Int'l Symposium on Computer Architecture, pp. 344–354, May 1990.

P.P. Chang, N.J. Warter, S.A. Mahlke, W.Y. Chen, and W.W. Hwu. Three Architectural Models for Compiler–Controlled Speculative Execution. IEEE Transactions on Computers, vol. 44–4. Apr. 1995.

R.P. Colwell, R.P. Nix, J.J. O'Donnell, D.B. Papworth, and P.K. Rodman. A VLIW Architecture for a Trace Scheduling Compiler. IEEE Transactions on Computers, C–37 Aug. 1988.

S.A. Mahlke, D.C. Lin, W.Y. Chen, R.E. Hank, R.A. Bringmann, and W. W. Hwu. Effective Compiler Support for Predicated Execution Using the Hyperblock. In Proceedings of the 25th International Symposium on Microarchitecture, Dec. 1992.

L. Gwennap. Intel, HP make EPIC disclosure. Microprocessor Report, 11(14):1–9, Oct. 1997.

* cited by examiner

*Primary Examiner*—Scott Baderman
(74) *Attorney, Agent, or Firm*—Gardner Carton & Douglas LLP

(57) ABSTRACT

Disclosed is a method and system for handling inline recovery from speculatively executed instructions. Each register may be provided with an E-tag, that, when set, indicates an exception occurred in the generation of the value stored in its register, and an R-tag, which is used to manage data flow dependencies in recovery mode. Recovery is performed by re-executing speculatively those set of speculative instructions that are data flow dependent upon a first excepting speculative instruction. The disclosed invention provides an architecture and method for efficient exception handling when combining control speculation, data speculation and predication, thereby resulting in substantially enhanced instruction level parallelism.

10 Claims, 10 Drawing Sheets

| FIG. 2A-1 |
| FIG. 2A-2 |

| BR | R₁ | R₂ | TARGET |

Fig. 5A

|    | DS | S |    |      |
|----|----|---|----|------|
| LD | 0  | 0 | R1 | ADDR |

Fig. 5B

| LD | 1 | 0 | R1 | ADDR |

Fig. 5C

| LD | 0 | 1 |  | ADDR |

Fig. 5D

| LD | 1 | 1 |  | ADDR |

Fig. 5E

|     | S |    |    |    |
|-----|---|----|----|----|
| ADD | 0 | R1 | R2 | R3 |

Fig. 5F

| ADD | 1 | R1 | R2 | R3 |

Fig. 5G

| ADD | 0 | P1 | R1 | R2 | R3 |

Fig. 5H

| CHK | R1 |

Fig. 5I

| CHK | R1 | TARGET |

Fig. 5J

| LD  | r6, 8          |
|-----|----------------|
| ADD | r5, r6, r7     |
| BEQ | r5, r2, LABEL1 |
| ••• |                |
| STO | r3, ADDR1      |
| ••• |                |
| LD  | r1, ADDR2      |
| ADD | r1, 5          |

LABEL1:

| LD  | r6, 8          | LD  | r1, ADDR2 <CS> |
|-----|----------------|-----|----------------|
| ADD | r5, r6, r7     | ADD | r1, 5 <CS>     |
| BEQ | r5, r2, LABEL1 |     |                |
| ••• |                |     |                |
| STO | r3, ADDR1      |     |                |
| ••• |                |     |                |
| CHK | r1             |     |                |

LABEL1:

Fig. 6

METHOD AND APPARATUS FOR ENHANCING INSTRUCTION LEVEL PARALLELISM

This invention was made with Government support under Grant No. CCR-96-29948 awarded by the National Science Foundation. The Government has certain rights in the invention.

FIELD OF THE INVENTION

The present invention relates generally to enhancing instruction level parallelism in a multi-issue processor environment, and relates more particularly to a technique for the efficient recovery of exceptions generated during speculative execution.

BACKGROUND OF THE INVENTION

The performance of modern microprocessors has been increasing at a rapid and dramatic pace. Although microprocessor clock speeds keep increasing at a relatively moderate pace, microprocessor processing power has been increasing dramatically due to microprocessors having parallel architecture features. In 1990, conventional microprocessors executed one instruction per cycle. By 1995, conventional microprocessors had the ability to execute up to four instructions per cycle. It is anticipated that within about the next year, microprocessors will be widely available that are capable of executing up to at least eight instructions per cycle. A microprocessor that is capable of executing multiple instructions per cycle is also referred to as a multi-issue processor.

Despite the dramatic increase in the potential processing power of multi-issue processors, deficiencies in compiler technology and supporting architecture design typically limit the actual processing power realized to only a small fraction of the massive potential of the multi-issue processor. Unless a compiler and the supporting hardware expose substantial portions of the instructions in parallel to the microprocessor hardware, the processing power potential of the microprocessor is largely wasted. Thus, much attention has been focused upon techniques to increase the amount of instruction level parallelism (ILP) visible to the multi-issue microprocessor so as to realize the great processing power advantages of multi-issue microprocessors.

Three techniques have been studied individually to increase ILP: (1) control speculation, (2) data speculation, and (3) predication. Control speculation and data speculation fall into a more general category of speculative execution, where the execution of instructions are performed before their proper execution conditions have been determined.

Control speculation breaks control dependencies which occur between branches and other operations. In other words, instead of conventionally executing instructions sequentially, the schedule of instructions is modified such that certain instructions are moved up in the schedule and executed in parallel with other instructions and at a time when it is not necessarily known with certainty that the control flow of the code will require actual execution of those instructions. Such instructions are executed speculatively, i.e., executed based upon an assumption that the control flow will dictate that they should actually be executed.

An operation is control dependent on a branch if the branch determines whether control flow will actually reach the operation during the execution of the program. A control dependence is broken by guessing a branch will go in a particular direction, thereby making operations along the predicted direction to execute independently of the branch. Breaking control dependencies through control speculation reduces control dependence height and results in a more compact instruction execution schedule.

FIG. 6 illustrates a very simple example depicting control speculation. On the left is illustrated the instruction schedule for a sample instruction segment that dies not use control speculation. On the right is illustrated the same set of instructions, but scheduled using control speculation with a two-issue processor, sequence of execution of each of the processors being indicated by the two separate columns. When control speculation, is used the instructions associated with the LABEL1 may be moved up in the schedule and executed control speculatively (indicated with <CS>) simultaneously with other instructions, as illustrated. As can be seen in the speculative version, two different LD instructions and two different ADD instructions are executed simultaneously. At the location where the LD r1, ADDR2 instruction was located (at LABEL1) in the non-speculative version, there is substituted a CHK instruction in the speculative version that checks register R1 to determine if an exception occurred as a result of the control speculative execution. If no exception was detected from register R1, then the speculation was successful and, as seen, the length of the code schedule has been reduced. However, if an exception was detected from register R1, such as if the memory being accessed by the load caused a segmentation violation, page fault, TLB (Translation Lookaside Buffer) miss, or cache memory miss, then the load of the control speculation redoes additional handling, and recovery should be initiated by re-executing the speculatively executed set of instructions.

Data speculation breaks data flow dependencies between memory operations. Two memory operations are flow dependent on one another if the first operation writes a value to an address and the second operation potentially reads from the same address. Thus, the original order of the memory operations must be maintained to ensure proper value flow. For a dependence to exist, the operation need only potentially read from the same address. If two memory operations are not provably independent, they are dependent by definition. A memory dependence where the dependence control is not certain is referred to as an ambiguous memory dependence. A memory dependence is broken by guessing that the two memory operations will access different locations, thereby making the operations independent of one another. With data speculation, memory operations may be aggressively reordered to effectively reduce memory dependence height which further results in a more compact instruction schedule.

Another technique that has been explored to increase ILP is predication. Predicated execution is a mechanism that supports conditional execution of individual operations based on Boolean guards, which are implemented as predicate register values. With predication, the representation of programmatic control flow can be inherently changed thereby physically restructuring the control flow into a more efficient form execution on a wide-issue processor.

Speculative execution, however, introduces additional complexities and requires different and more sophisticated handling of particular conditions. One of the greatest challenges in dealing with speculatively executed instructions is how to handle exception or error conditions to ensure proper program control. When a non-speculatively executed instruction generates an exception condition, the exception is reported and handled immediately. However, when a speculatively executed instructions encounters an exception condition, it may be necessary to defer the exception to ensure that it does not interfere with proper operation of the program. Furthermore, exception recovery may require a long and time-consuming process, so it is frequently preferable to defer an exception encountered in a speculatively executed instruction until it is determined with certainty that the program flow actually requires execution of the instruction.

U.S. Pat. No. 5,692,169 to Kathail et al. for a Method and System for Deferring Exceptions Generated During Speculative Execution is directed to a technique where exceptions generated during execution of speculative instructions are deferred. The reference indicates that deferred exceptions may be detected and reported using a check operation either incorporated into a non-speculative operation or inserted as a separate check operation. The reference, however, does not provide a particular technique for recovery, but merely states that "when an exception is detected, the CPU branches to an exception handling routine."

Smith et al. in Efficient Superscalar Performance Through Boosting, Proceedings of the Fifth International Conference on Architecture Support for Programming Languages and Operating Systems, October, 1992, pp. 248–259, propose a model that where the compiler generates recovery blocks— the exact sequence of instructions that must be re-executed when an exception is detected by a particular excepting speculated instruction. U.S. Pat. No. 5,694,577 to Kiyohara et al. for a Memory Conflict Buffer for Achieving Memory Disambiguation in Compile-Time Code Schedule also teaches using recovery blocks to handle exceptions from speculatively executed instructions. In addition, Kiyohara discloses a memory conflict buffer that may be used to detect a situation where data speculation recovery is needed as a result of data pre-loaded from a memory location which is affected by one or more subsequent store operations.

Although the use of recovery blocks may reduce complexity in the exception handling state, it results in a dramatic increase in code size due to the addition of the recovery blocks. An additional disadvantage of recovery blocks is that the code is typically organized such that the blocks are located at a section of the code which is relatively distant from the code that generated the exception, resulting in frequent and time-consuming page faults, translation look-aside buffer misses, or long latency cache misses.

SUMMARY OF THE INVENTION

The foregoing limitations and disadvantages of the prior art are addressed in the present invention which provides a technique for handling recovery from speculatively executed instructions which does not use separate recovery blocks. This technique of the present invention promotes better instruction cache performance by the selective re-use of code for recovery instead of using recovery blocks. In addition, the elimination of recovery blocks results in significantly smaller code size than for an implementation that requires additional explicit recovery code. In addition, the present invention provides an architecture and method for efficient exception handling when combining control speculation, data speculation and predication, thereby resulting in substantially enhanced ILP.

The advantages of the present invention are realized in a preferred embodiment that provides an instruction set capable of distinguishing between speculative and non-speculative instructions, a mechanism for deferring exceptions on speculatively executed instructions, a mechanism to detect and handle memory conflicts arising from speculatively executed instructions, and an architecture that ensures selective execution of only data flow successors of excepting speculative instructions during recovery. The exception recovery technique of the present invention is particularly advantageous, and may be implemented by providing a bit to each register that serves as a flag or tag to indicate which instructions should be executed during recovery. Thus, by providing one or two additional bits in operation encodings, two bits added to each register, and a memory conflict buffer, the present invention can accurately detect, report, and recover from exactly those exceptions that would have occurred in non-speculated code, and can recover from memory conflicts in data-speculative code.

BRIEF DESCRIPTION OF THE DRAWINGS

The above and further advantages of the invention will be more clearly appreciated from the following detailed description when taken in conjunction with the accompanying drawings, in which:

FIG. 2A-1 is a first flow diagram that illustrates the process flow of one embodiment of the present invention.

FIG. 2A-2 is a second flow diagram that illustrates the process flow of one embodiment of the present invention.

FIGS. 5 A–J are diagrams of several sample instruction in accordance with certain features.

FIG. 6 illustrates a very simple example of a code schedule that is re-organized in connection with control speculation.

The invention is described herein in connection with certain preferred embodiments and examples. In particular, there is provided a detailed description of several exemplary architectures, process flows, and related embodiments and examples. However, it should be understood that it is not intended to limit the invention to those particular architectures, process flows, embodiments and examples and that the present invention may also be readily implemented and advantageously used in a much wider variety of architectures, process flows and embodiment. It is intended that the fundamental features of the invention as described herein cover all alternatives, modifications and equivalents falling within the spirit and scope of the invention as defined by the appended claims.

DETAILED DESCRIPTION OF THE INVENTION

Figure 1:
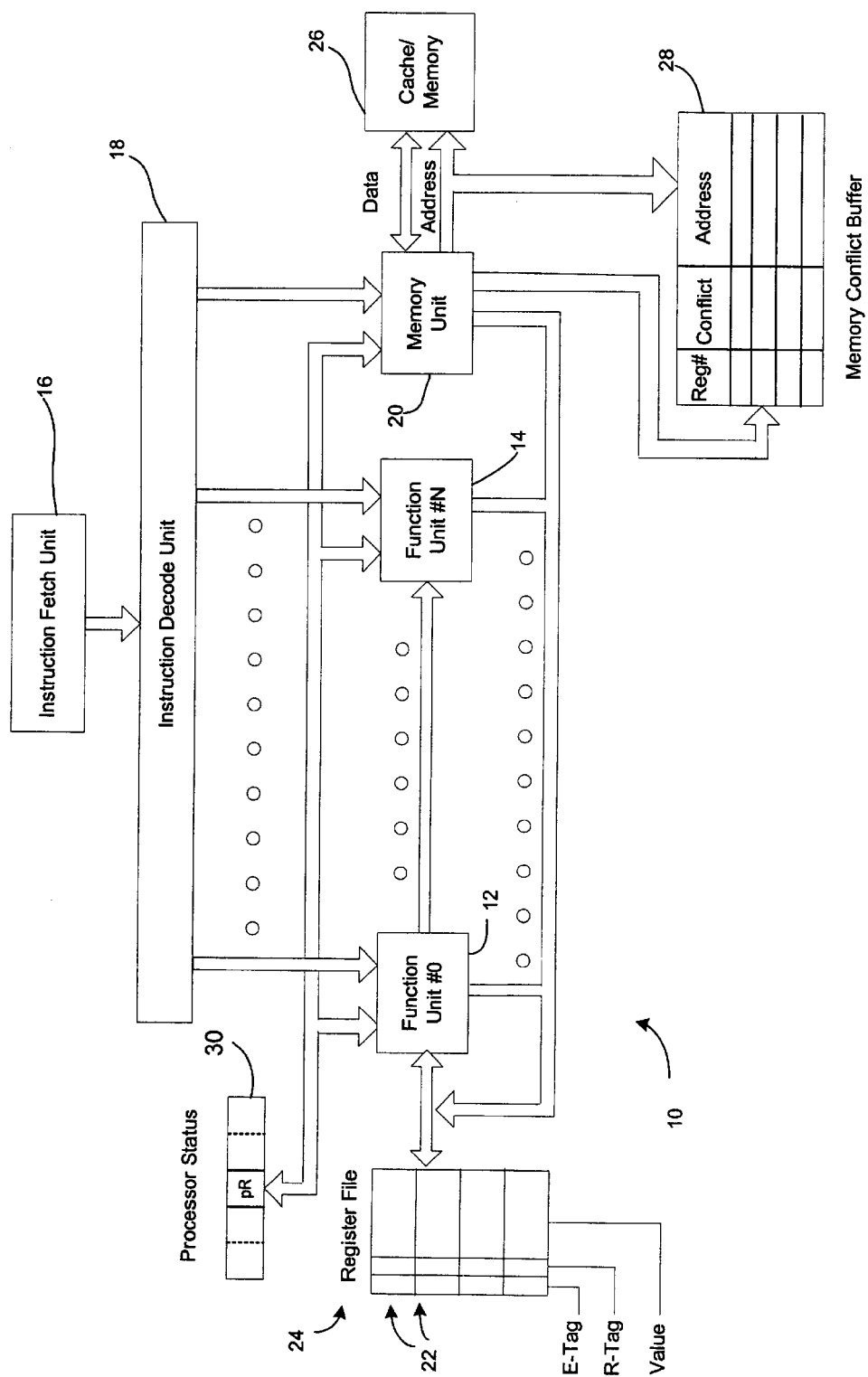
FIG. 1 is a schematic block diagram that illustrates one embodiment of a microprocessor architecture with which the invention may be implemented.

Turning first to FIG. 1 there is illustrated a block diagram depicting various features of a microprocessor architecture 10 that may be used to implement the present invention. This particular architecture 10 is a multi-issue architecture where several function units 12, 14 are provided that may execute instructions simultaneously. An instruction fetch unit 16 supplies instructions scheduled for execution to an instruction decode unit 18. After decoding of an instruction, appropriate signals are supplied from the instruction decode unit 18 to the function units 12, 14 as well as the memory unit 20. The function units 12, 14 typically carry out operations that result in reading or storing values or other information in various registers 22 of the register file 24 as well as possibly interacting with the memory unit 20 to issue various memory requests. The memory unit 20 handles memory requests, such as loads and stores, that may be requested from any of the function units 12, 14 and, in some architectures, based upon instructions from the instruction units 16, 18. The memory unit 20 may, in response to a particular memory request, fulfill the request by loading or storing the particular data from memory, or, alternatively, may return status or other information regarding the request before performing the request. The memory unit 20 is typically connected to a cache memory 26, a type of high speed buffer storage, as well as main memory (not shown), by data and address buses.

In accordance with an important aspect of the present invention, there is also provided a memory conflict buffer 28. The memory conflict buffer 28 stores information that is used by the system to determine if any memory conflicts have occurred as a result of speculative execution of instructions. In particular, the memory conflict buffer 28 stores the addresses of data-speculative loads until their independence with respect to intervening stores can be established. By way of example, the memory conflict buffer 28 may be partitioned as illustrated to include, for each entry, information related to a register number, a conflict indicator and a memory address. When a speculative load is performed, an entry is added to the memory conflict buffer 28 which temporarily associates the destination register number with the address from which the value in the register was speculatively loaded. The conflict indicator will initially be cleared, i.e., set to 0. When a store operation is subsequently performed, the destination addresses of the store operation are checked against the addresses in the memory conflict buffer 28 to detect memory conflicts, and if a conflict is detected the conflict indicator (which may be represented as a single bit) will be set to indicate a memory conflict for the associated memory address.

As will be explained in greater detail in the following, when the control flow of a program indicates that a speculatively executed instruction is indeed needed, a check operation is performed to determine if a memory conflict has occurred. The check operation queries the memory conflict buffer entry for the destination register of the load to determine if the memory location from which the register was loaded has been accessed by an intervening store, by determining whether the associated conflict indictor is set. If such a conflict exists (i.e., the conflict indicator is set), data speculation has failed and recovery should be performed.

The architecture is also provided with a register file 24 that accommodates a plurality of different high speed registers that are used to perform various operations indicated by the function units 12, 14. In accordance with an important aspect of the present invention, each register 22 may be a conventional register to which are added two additional tags, or fields. Included is an E-tag which, when set, indicates that an exception occurred in the generation of the value stored in its register, as well as an R-tag, which is used to selectively execute only data flow successors of excepting speculative operations during recovery.

Although the present invention has been described in connection with the illustrated architecture 10 where the register file 24 is partitioned to include additional R-tags and E-tags, it is well within the scope of the invention if the R-tags and E-tags are implemented in a separate buffer. For example, in addition to a conventional register file, a separate R-tag and E-tag buffer could be provided, where each entry relates to a corresponding register and the R-tag and E-tag status of the various entries of the buffer indicate the R-tag and E-tag status of the respective registers. In this manner, the invention may be implemented without any specific modifications to the conventional register file, but instead a separate buffer is added that provides the R-tag and E-tag features.

The architecture also includes a processor status word 30 which may be conventional but to which is added a special mode bit, the recovery mode bit, illustrated as pR, which indicates whether the currently executing instruction should be executed under normal semantics or recovery semantics.

Turning now to FIG. 5, there is illustrated an example of several different types of instructions that may be used in accordance with the present invention. In order to take advantage of the unique features of the architecture and operation of the present invention, some instructions will be modified from a conventional format. FIG. 5A illustrates a conventional branch instruction where, upon a particular predetermined condition between the value of registers R1 and R2 (such as greater than, equal to, less than, etc.), the execution will branch to the code location specified as the TARGET, which typically will include information relating to the program counter (PC) of the code location for the branch. Otherwise, operation will continue with the instruction following the conditional branch instruction illustrated.

FIGS. 5B through 5E illustrate sample load instructions that have been modified from a conventional format to allow the microprocessor to distinguish between a speculative and a non-speculative load operation. According to a preferred embodiment of the invention, the instructions may be encoded so as to provide a data speculation indicator and a control speculation indicator. In the example illustrated, the load instructions have been modified to provide a DS-bit, which is an indicator of data speculation, and an S-bit, which is an indicator of control speculation.

The instruction illustrated as FIG. 5B is a load instruction that is non-speculative because the DS-bit and the S-bit are cleared. Accordingly, this instruction would be executed non-speculatively to load into register R1 the contents of the data located at the address ADDR. FIG. 5C illustrates another load instruction that should be executed with data speculation because the DS-bit is set. FIG. 5D illustrates another load instruction that should be executed with control speculation because the S-bit is set. Finally, FIG. 5E illustrates another load instruction that should be executed with data speculation and control speculation because both the DS-bit and the S-bit are set. As can be seen, the set of load instructions illustrated in FIGS. 5B through 5E have been modified from conventional format to include two additional bits for indicators of control and data speculation. Since load instructions can be either data speculated or control speculated, or both, the load instructions should preferably be modified to independently provide an indicator of control speculation and data speculation. As should be evident, in an embodiment that supports only control speculation, the data speculation indicator does not need to be provided for the load instruction. Similarly, in an embodiment that supports only data speculation, the control speculation indicator does not need to be provided for the load instruction.

FIGS. 5F and 5G illustrate ADD instruction types that have been modified from a conventional format to provide an indicator for control speculation. The indicator is provided, by way of example, as an additional bit, the S-bit, that, when set indicates that the instruction should be executed with control speculation and when clear indicates that the instruction should be executed non-speculatively. FIG. 5F illustrates an ADD instruction that should be executed non-speculatively because the S-bit is cleared. The contents of registers R2 and R3 will be added together with the result placed in register R1. FIG. 5G illustrates another ADD instruction, but this add instruction will be executed with control speculation because the S-bit is set.

FIG. 5H illustrates a type of predicated instruction similar to the ADD instruction illustrated in FIG. 5F. This predicated instruction, however, is modified such that it also refers to a predicate register P1 to determine if the instruction should execute. Thus, prior to execution of the instruction, the contents of the predicate register P1 is examined and, if the contents indicate a TRUE condition (such as P1 being set to 1), then the instruction will execute, otherwise, if the contents of the predicate register P1 indicate a FALSE condition (such as P1 being set to 0), then the instruction will not execute. Thus, through instructions referencing predicate registers, as illustrated in FIG. 5H, predication can be implemented.

FIGS. 5I and 5J illustrate sample CHECK instructions used in connection with the features of control and data speculation the may be implemented in accordance with the present invention.

FIG. 5I illustrates an explicit control speculative check instruction which, upon execution, determines whether an exception has been deferred by checking to determine if the E-Tag of the corresponding R1 register has been set. If the E-tag is set, it indicates that a deferred exception occurred, and the CHECK instruction will use the contents of the R1 register to set the PC of the microprocessor to re-execute the instruction that originally caused the exception. Otherwise, when the E-tag of the R1 register is cleared, i.e., set to 0, this indicates that no deferred exception occurred, and the check instruction does not change the execution of the microprocessor.

In addition to the explicit control speculative check instruction illustrated in FIG. 5I, any general non-speculative instruction that uses register source operands can also function as implicit checks of control speculative instruction. For example, the functionality of the ADD instruction of FIG. 5F may be modified to also include an implicit check operation. An implicit check can be performed to check the E-tags of both of its referenced source registers, registers R1 and R2, before proceeding with the defined computation, in this case, an ADD operation. In this way, the implicit check includes the same functionality as the explicit check instruction by detecting any registers with E-tags set and updating the processor PC with the corresponding register contents if any source register E-tag is indeed set.

FIG. 5J illustrates an explicit data speculative check instruction. The explicit data speculative check instruction refers to register R1. Thus, to perform this check, the memory conflict buffer is examined to determine if the conflict indicator for register R1 is set (indicating a memory conflict occurred) or is cleared (indicating no memory conflict occurred). Therefore, if no subsequent store operations were made to the corresponding memory address of the memory conflict buffer (which is the address of the data speculative load), the conflict indicator would be cleared, i.e., set to 0, and the explicit data speculative check instruction does not change the execution of the microprocessor. However, if a memory conflict occurred as indicated by a conflict indicator of the associated entry for the register R1 in the memory conflict buffer being set to 1, the explicit check initiates a recovery mode and branches to the code location specified as the TARGET, which typically will include information relating to the PC of the data speculative load instruction.

Figures 1, 2A:
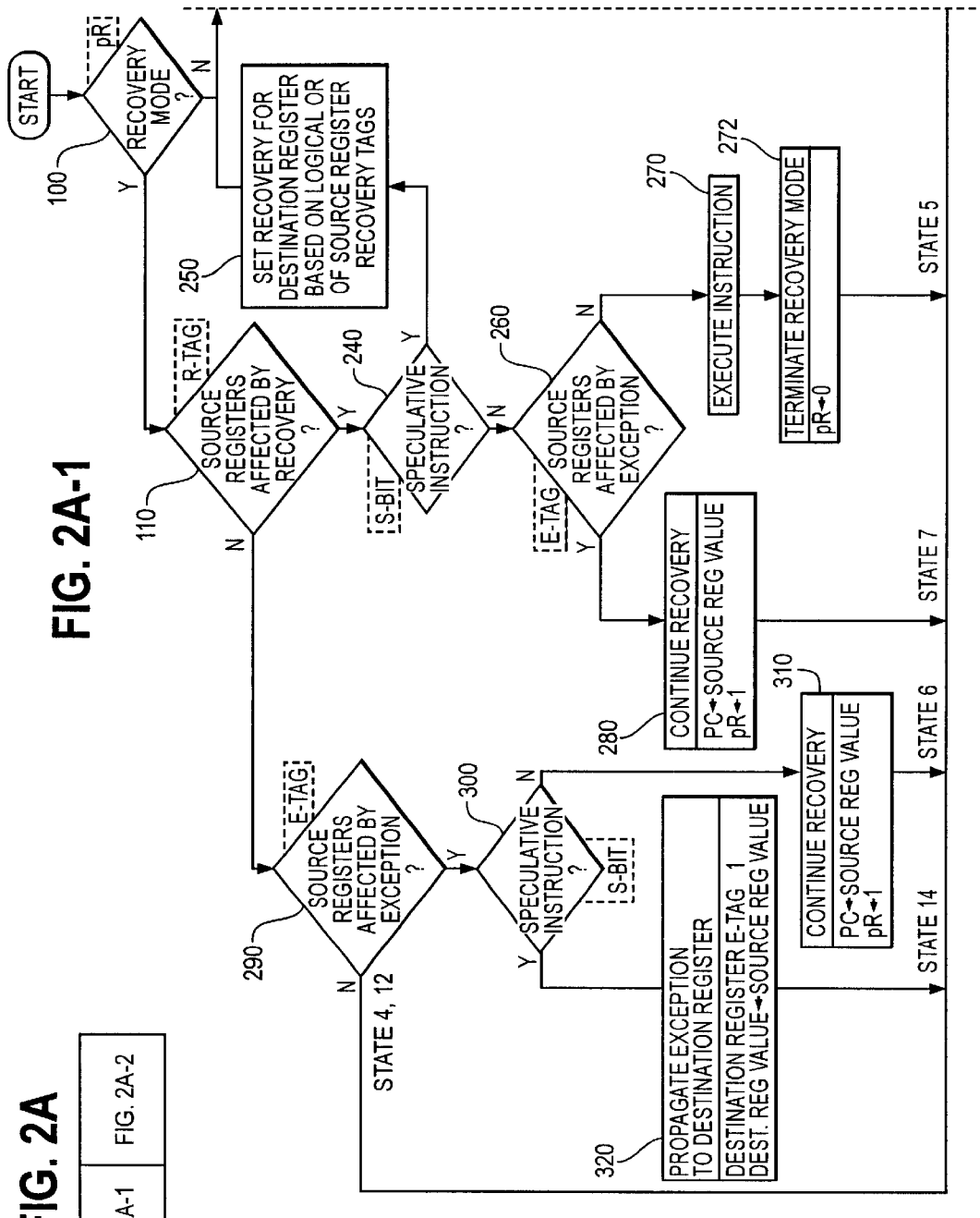
Figures 2, 2A:
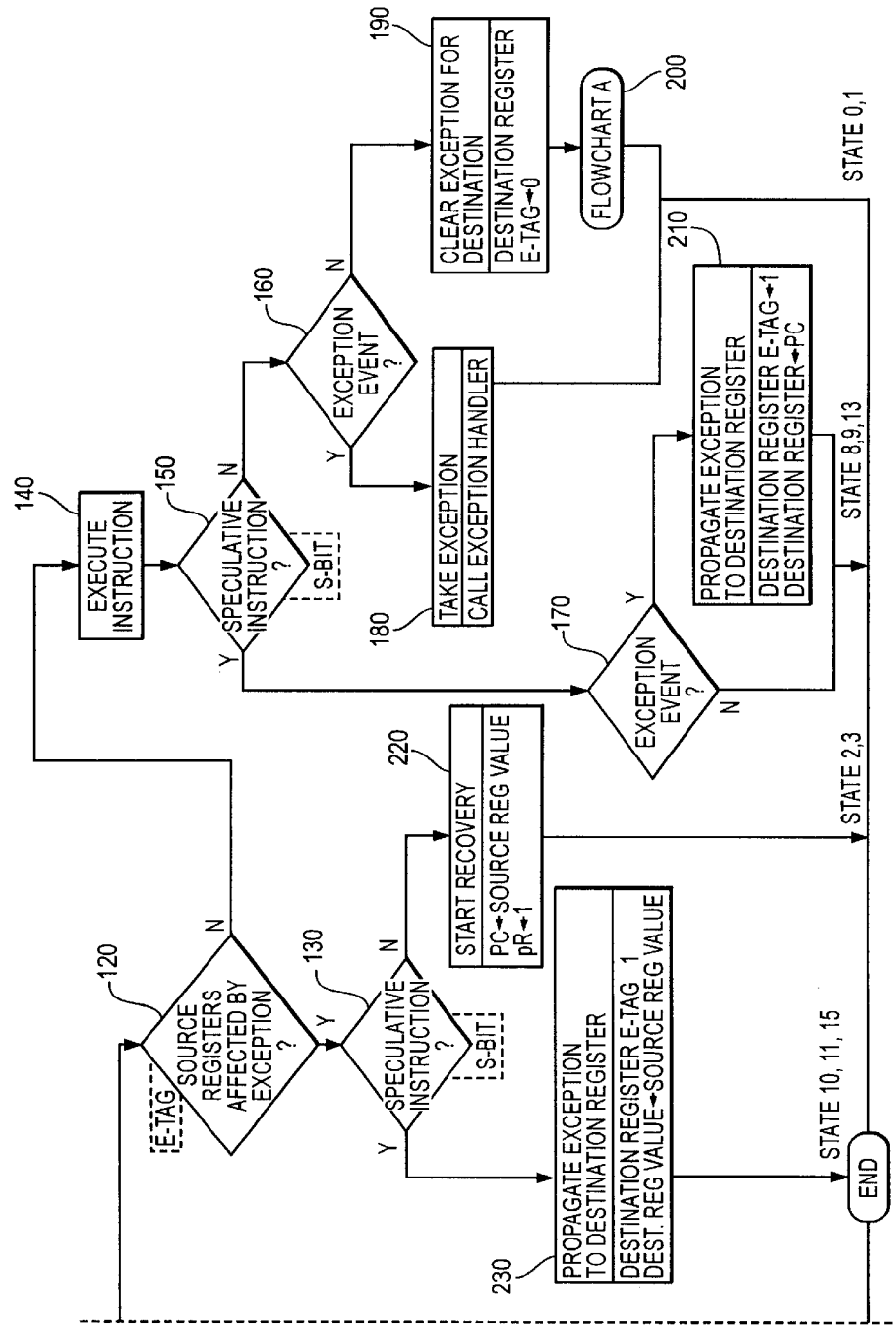

Turning now to FIGS. 2A-1 and 2A-2, there is illustrated a schematic flow diagram that depicts the control flow for executing instructions according to an embodiment of the present invention that implements data speculation, control speculation, and the unique and advantageous inline recovery technique. According to one embodiment of the invention, after an instruction is fetched, it is decoded and executed according to the flow chart of FIGS. 2A-1 and 2A-2. The various tasks performed in connection with execution of the instructions may be carried out by more than one of the elements of the architecture including, for example, the functional units, the instruction units and the memory unit. As a matter of convention with the flow charts, when a decision block is reached, for reference purposes, the particular data or information that is considered or analyzed in the decision process is placed next to the decision block within a dashed line.

In the first step, step 100, it is determined whether the microprocessor is in recovery mode or normal mode. This is accomplished by checking the pR bit in the processor status word. If pR is set, the microprocessor is in recovery mode and the process continues to step 110; otherwise, if pR is clear, the microprocessor is in normal mode and the process continues to step 120.

Reverting back for a moment to the example instructions illustrated in FIGS. 5A through 5G, some of the instructions refer to source registers and destination registers. For example, FIG. 5F depicts an add instruction where registers R2 and R3 are source registers and register R1 is a destination register. In other words, the information contained within the source registers, registers R2 and R3, are used to perform the instruction and, in the case of the add instruction, the result is placed in the destination register, register R1. As will be evident, some instructions do not refer to a source register, such as, for example, the load instructions depicted in FIGS. 5B through 5E. Furthermore, some instructions do not refer to a destination register, such as, for example, the branch instruction illustrated in FIG. 5A where registers R1 and R2 are source registers. Although not illustrated as an example in FIG. 5, some instructions refer to neither source registers nor destination registers such as would be the case, for example, for an unconditional jump instruction.

In step 120, it is determined whether any of the source registers for the instruction were affected by an exception. This is accomplished by checking the E-tag of any of the source registers. If the E-tag of any of the source registers is set, then the process continues to step 130 to handle a situation where the microprocessor is not in recovery mode and at least one of the source registers of the current instruction were affected by an exception. Otherwise, in step 120, if none of the E-tag of any of the source registers is set (or if it is an instruction where no source registers are indicated and thus there is no E-tag that may be set), the process continues to step 140 to execute an instruction in a situation where the microprocessor is not in recovery mode and none of the source registers were affected by an exception.

In step 140, the instruction is executed substantially in a conventional manner and the process continues to step 150 where it is determined, according to the semantic of the instruction, if the instruction is speculative or non-speculative. In particular, in step 150, the instruction is examined to determined if the S-bit indicator is set. If the S-bit indicator is not set (or the instruction is of a type where there is no S-bit indicator and therefore it cannot be set), this indicates that the instruction should be executed non-speculatively and the process continues to step 160. Otherwise, in the case where the S-bit indicator is set, which indicates that the instruction should be executed speculatively, the process continues to Step 170.

In step 160, it is determined whether an exception event occurred during execution of the instruction in step 140. Typically, such an exception during execution will be detected by the functional unit in the event, for example, a divide by zero operation is attempted. If an exception event occurred during execution of the instruction in Step 140, then, since the microprocessor is not in recovery mode (Step 100), there was no exception detected from any of the source registers (Step 120) and the instruction is to be executed non-speculatively (Step 160), then the process continues to Step 180 where, essentially in accordance with a conventional microprocessor, the exception is taken immediately and the exception handler is called, and the process ends in connection with execution of the instruction. Otherwise, in step 160, if there was no exception event from execution of the instruction in Step 140, the process continues to step 190 where the exception indicator for the destination register, i.e., the E-tag, is cleared to indicate that no exception was encountered and the process continues to step 200 of the flow chart of FIG. 2A-2 for further steps in connection with the present invention.

In step 150, if the instruction is determined to be a speculative instruction by, for example, the S-bit of the instruction being set, the process continues to step 170 where it is determined whether an exception event occurred during execution of the instruction in Step 140. If an exception event occurred, then the process continues to step 210 where an exception indicator is propagated to the destination register by setting the E-tag of the destination register and recording the PC of the excepting instruction to the destination register.

In accordance with an important alternative embodiment of the present invention, the category of exception events detected in step 170 that result in deferred execution of the speculative instruction may be broader than the category of traditional exceptions. For example, if it is determined that execution of the instruction would take a great deal of time to perform or would require an undesirable amount of resources, the speculative instruction may essentially be treated as an exception event and its execution may be deferred. For example, in some cases, the instruction will require loading of information that is no longer available in main memory or cache memory such that execution would require perhaps over hundreds of cycles to perform. In such a case, the microprocessor may determine that execution of such a speculative instruction at the present is too costly and, instead, execution should be deferred and the E-tag should be set to treat the execution as if an exception occurred. Thus, exceptions may be classified a "hard" exceptions (these would be conventional exception causing machine events such as a divide by zero error) where execution of the instruction has encountered an error that must be reported, and "transparent" exceptions for speculative instructions where execution at the present time is determined to be too costly and deferring execution is preferable. Such transparent exceptions might be triggered by page faults, TLB misses and similar situations that occur independent of a program's behavior.

This alternative embodiment would require a slight modification to the procedures performed in steps 140, 150 and 170. An intelligent algorithm may be devised to handle such situations where the cost (as far as system resources and time) of executing the instruction at the present time may be weighed against the estimation of the likelihood that the speculative instruction will actually be needed, to determine whether to execute the instruction and incur the execution cost. If the present execution cost is too great, the execution may be deferred by treating the speculative execution as an exception.

Step 210 is an important aspect of the present invention in that, instead of immediately calling an exception routine to handle an exception for a speculative instruction, the exception is suppressed or deferred until it is known that the instruction is needed. However, the E-tag of the destination register is set, thereby indicating or "warning" subsequent instructions that might use that destination register as a source register. The PC of the excepting instruction is also stored in the register so that inline recovery may be initiated at the excepting instruction. This PC information is used when recovery is entered, such as in step 220, such that the PC directs execution to the excepting instruction.

In step 120, if it is determined that at least one of the source registers referred to by the current instruction were affected by an exception, i.e., at least one of the source register E-tags is set, the process continues to step 130 where the instruction is checked to determine if it is a speculative instruction, i.e., whether the S-bit is set. It should be noted that the present invention is being described such that the indicator of whether an instruction is speculative is presented as a single bit, an S-bit. However, essentially any implementation is suitable that allows the microprocessor to distinguish between a speculative instruction and a non-speculative instruction. Likewise, the DS-bit is similarly described herein by way of example as a single bit within an instruction, but essentially any implementation is suitable that allows the microprocessor to distinguish between an instruction to be performed with data speculation and an instruction performed without data speculation. If, in step 130, if it is determined that the instruction is speculative, the process continues to step 230 where the source register exception, which was detected in step 120, is propagated to the destination register. This is accomplished by setting the destination register E-tag and assigning the source register value, which relates to the PC of the excepting instruction encountered by the source register, to the destination register. Thus, the same PC of the earlier-encountered excepting instruction (that used the source register) is copied into and preserved by the destination register for use in the inline recovery procedure, if necessary, when it is known that the instruction is needed. Thus, instead of executing an instruction in which it is known that one of the source registers encountered an exception (step 120), the speculative instruction (step 130) is not executed, and execution is deferred and inline recovery information is preserved (step 230) in the event it needs to be used at a later stage if it is determined that the instruction flow actually required execution of the instruction.

Otherwise, in step 130, if it is determined that the instruction is not speculative, then there is no reason to suppress execution and the process continues to step 220 to initiate recovery from the source register exception that was detected in step 120. This is accomplished by setting the PC to the value of the source register and setting the pR indicator of the processor status word to indicate that the microprocessor has entered recovery mode. In the event that the instruction refers to several source registers, the PC may be set to the value of any of the source registers for which an E-tag is set (indicating an exception occurred), since recovery will need to be performed for each of the E-tags set in any of the source registers. After recovery is completed for one of the source registers, its E-tag will be cleared and then recovery will be performed for any of the remaining source registers with an E-tag set. At step 220, the value of the source register relates to the PC of the original excepting instruction to which the current instruction is data dependent. Such a value was stored, for example, at step 210 when an exception event was detected for an instruction and the PC was recorded in the destination register which, in step 220, serves as the source register for a subsequent instruction. The PC of the original excepting instruction may have been propagated by intermediate instructions such as through step 210, step 230 or step 320. Through this technique, sufficient information may be stored in the registers to successfully perform inline recovery in accordance with the present invention.

So far, essentially all of the steps described in the flow diagram of FIGS. 2A-1 and 2A-2 have been directed to steps performed while the microprocessor is in its normal mode, i.e., when the pR indicator of the processor status word is cleared. However, if in step 100, it is determined that the pR indicator of the processor status word is set, then the microprocessor is in recovery mode and the process continues to step 110. The following steps describe steps performed while the microprocessor is in recovery mode.

In step 110, if it is determined that any of the source registers of the instruction indicate that they are affected by recovery, i.e., if the R-tag for any of the source registers is set, the procedure continues to step 240 where the instruction is checked in step 240 to determine if it is a speculative instruction. If it is a speculative instruction, i.e., if the S-bit of the instruction is set, the process continues to step 250 where the R-tag for the destination register is set to the logical OR of the R-tags of the source registers. In other words, the R-tags of the source registers are considered and, if the R-tag of any source register is set, the R-tag of the destination register is also set so as to preserve valuable information needed to implement the advantageous inline recovery operation in accordance with the invention. If a particular instruction does not refer to any source registers, the R-tag of the destination register is cleared. Next, the process continues to step 120 and proceeds as previously described.

If, in step 240, it is determined that the current instruction is not speculative, i.e., that the S-bit is clear, the process continues to step 260 where the source registers are checked to determine is they are data dependent upon the original instruction that set the process into the recovery mode. If none of the source registers are affected by the recovery mode or if the instruction is of a type that does not reference any source registers, i.e., none of the R-bits for the source registers is set, the process continues to step 270. Step 270 is reached when the recovery process has completed, because, in step 260, it was determined that none of the source registers were data dependent upon the original excepting instruction. Therefore, in step 270, the instruction is executed and in step 272 the recovery mode is terminated by clearing the pR indicator of the processor status word.

If, in step 260, it is determined that at least one of the source registers is affected by the exception, i.e., at least one of the source registers has an E-tag set, the process continues to step 280 where recovery is initiated by setting the PC to the value of the source register with an E-tag set and setting the recovery indicator pR of the processor status word to indicate that recovery is under way. Step 260, similar to step 310, corresponds to a situation where recovery is underway and another exception is detected from another speculatively executed instruction. Thus, the recovery process continues until all exceptions are handled for all speculatively executed instructions that are used.

If, in step 110, it is determined that none of the source registers are affected by the recovery or that there are no source registers referenced by the instruction, i.e., none of the source registers has an R-tag set, the process continues to step 290 where the source registers are checked to determine if any are affected by an exception. If any of the source registers are affected by the exception, i.e., if the E-tag is set for any of the source registers, the process continues to step 300 where it is determined whether the instruction is a speculative instruction, i.e., whether, for example, the S-bit is set. If, in step 300, it is determined that the current instruction is not speculative, i.e., the S-bit is cleared, the process continues to step 310 where recovery is initiated by setting the PC to the value of the source register with an E-tag set and setting the recovery indicator pR of the processor status word to indicate that recovery is under way.

If, in step 300, it is determined that the instruction is speculative, the process continues to step 320 where the source register exception is propagated to the destination register by setting the E-tag of the destination register and assigning the value of the source register to the destination register.

Figure 2B:
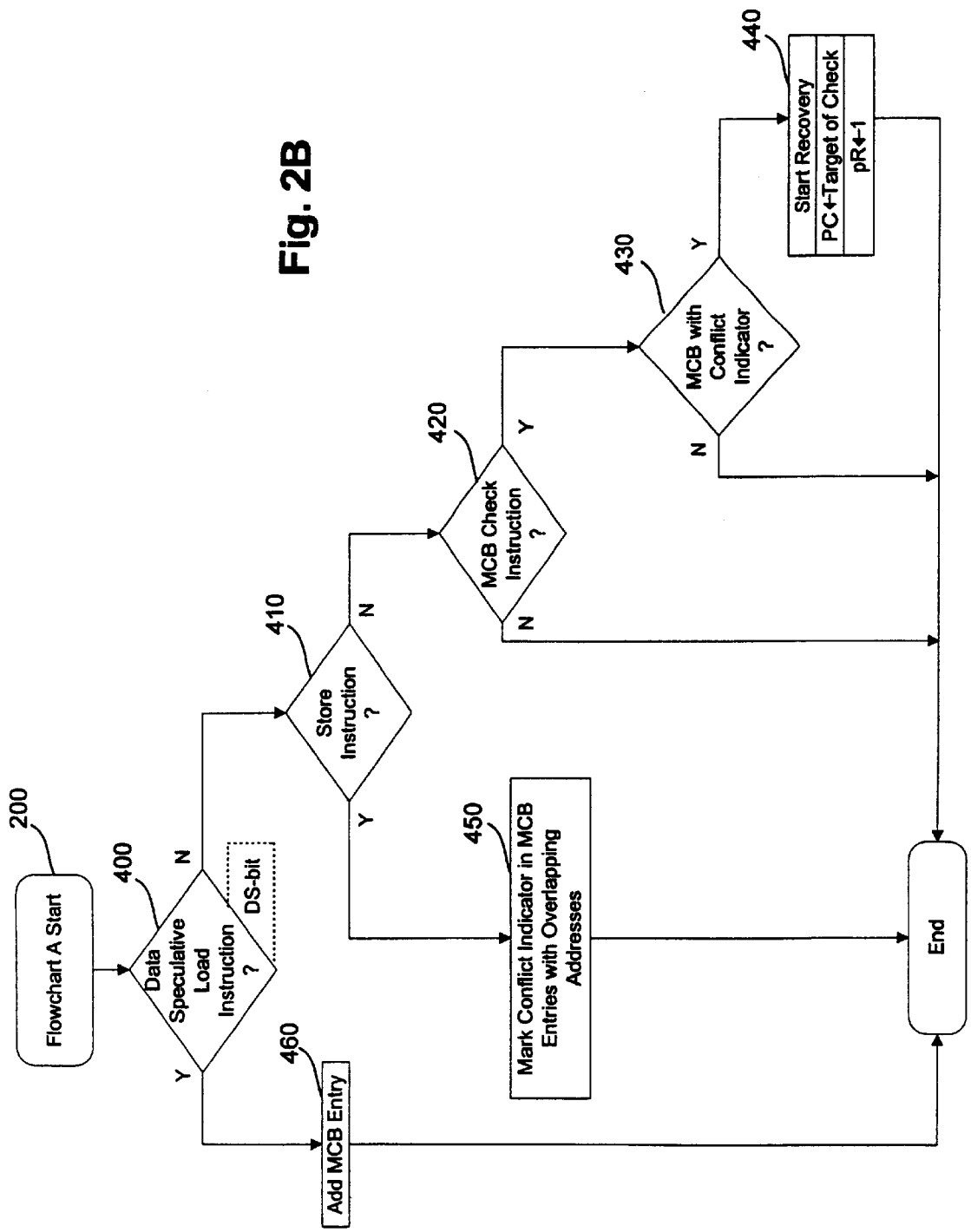
FIG. 2B is a continuation of the flow diagrams of FIGS. 2A-1 and 2A-2.

Turning now to the flowchart illustrated in FIG. 2B, this flowchart illustrates the steps that are continued from step 200 of the flowchart of FIG. 2A-1. From step 200, the process continues to step 400 where it is determined whether the current instruction is a date speculative load instruction, i.e., whether the DS-bit for the instruction is set. If the DS-bit is set, then the instruction is a data speculative load instruction and the process continues to step 460 where an entry in the memory conflict buffer is added. The information added to the memory conflict buffer will include identifying information for the destination register of the current instruction, a conflict indicator (which initially will be cleared) and the memory address associated with the load instruction. After an entry of information is added to the memory conflict buffer in step 460, execution of the current instruction is complete.

If, in step 400, it is determined that the instruction is not a data speculative load instruction, i.e., the DS-bit is cleared or the instruction is of a type that there is no DS-bit, the process continues to step 410 where it is determined whether the current instruction is a store instruction. If the current instruction is a store instruction, then the memory conflict buffer needs to be examined to determine if the store instruction stores information at the same address as a prior speculatively executed load instruction. Thus, in step 410, the memory conflict buffer entries are examined to determine if any have an address that corresponds to the address of the current store instruction. If the address of the current store instruction is found in the memory conflict buffer, then the conflict indicator is set for the corresponding entry of the memory conflict buffer to indicate that a memory conflict has been encountered. According to an important aspect of the invention, even though a memory conflict has been encountered, recovery is not yet initiated but information regarding the conflict is merely preserved because the load instruction that created the entry in the memory conflict buffer was executed speculatively. In other words, recovery will not be necessary unless the control flow requires that the speculatively executed instruction was necessary.

If, in step 410, it is determined that the current instruction is not a store instruction, the process continues to step 420 where it is determined whether the current instruction is a memory conflict buffer check instruction. Such a check instruction is encountered in a situation where the control flow has reached a point where the results of a speculatively executed instruction are necessary. If the current instruction is not a memory conflict buffer check instruction, as determined in step 420, the execution of the current instruction is complete. Otherwise, if in step 420 it is determined that the current instruction is a memory conflict buffer check instruction, the process continues to step 430, where the memory conflict buffer is examined to determine if the register number associated with the speculatively executed instruction relating to the check instruction is referenced by an entry of the memory conflict buffer. If such a register number is present, the entry is examined in step 430 to determine whether the conflict indicator indicates there was a memory conflict. If the conflict indicator indicates there was not a memory conflict, the process has completed execution of the instruction. Otherwise, if in step 430 the memory conflict buffer indicates that there was a memory conflict for the entry, the process continues to step 440 where the recovery process is initiated.

For further understanding of the invention the following Table I is provided to illustrate the various states of execution that may be encountered according to the process of the present invention of the flowchart of FIGS. 2A-1, 2A-2 and 2B. The first column provides a state number which is provided merely to identify the various possible states encountered for the execution of the instruction. Corresponding state numbers are provided in the flowcharts of 2A-1, 2A-2 and 2B to indicate where in the flowchart process flow the various states are reached. The second column provides the control speculation bit of an instruction, which previously has been referred to by way of example as an S-bit. The S-bit is cleared, i.e., set to 0, (or there is no S-bit) for any instruction that is not to be speculatively executed, i.e., any instruction which is to be executed non-speculatively. Alternatively, the S-bit is present and set to 1 for any instructions that are to be executed speculatively. Also provided in the chart is the condition of the E-tag and R-tag of any of the source registers that are referred to by the instruction. The various tasks performed for each situation are arranged into execution and exception actions. In Table I, the notation Dest= Exec means that the destination register receives the execution result of the instruction; DestE=0 means that the destination register E-tag is cleared (set to 0); DestE=1 means that the destination register E-tag is set (set to 1); DestR=0 means that the destination register R-tag is cleared (set to 0); DestR=1 means that the destination register R-tag is set (set to 1); pR=1 means that the recovery indicator of the processor status word is set (set to 1); pR=0 means that the recovery indicator of the processor status word is cleared (set to 0); PC=Src means that the program counter is set to the value of the program counter stored in the source register; and Dest=PC means that the program counter for the current instruction is stored in the value section of the destination register. As can be seen, the actions of some states, namely states are of no concern to the process (marked "irrelevant") because they relate to states that would not normally be encountered in the execution of any type of instruction and other states, although they may be encountered, do not need to change the machine state (marked "ignore"). However, for the sake of completeness, the states have been set forth in the table of states of Table I. For reference purposes, the various states of Table I are illustrated in the flow diagrams of FIGS. 2A-1, 2A-2 and 2B to indicate the flow path followed for each of the 16 different possible states.

TABLE I

| | Oper | | Any Source Reg | | | |
|---|---|---|---|---|---|---|
| State | S bit | pR | E-tag | R-tag | Execution Actions | Exception Actions |
| 0 | 0 | 0 | 0 | 0 | Dest = Exec, DestE = 0, DestR = 0 | Take exception |
| 1 | 0 | 0 | 0 | 1 | Irrelevant | — |
| 2 | 0 | 0 | 1 | 0 | Initiate Recovery, pR = 1, PC = Src | — |
| 3 | 0 | 0 | 1 | 1 | Irrelevant | — |
| 4 | 0 | 1 | 0 | 0 | Ignore - No change to machine state | — |
| 5 | 0 | 1 | 0 | 1 | Dest = Exec, DestE = 0, DestR = 0, pR = 0 | — |
| 6 | 0 | 1 | 1 | 0 | Initiate Recovery, pR = 1, PC = Src | — |
| 7 | 0 | 1 | 1 | 1 | Initiate Recovery, pR = 1, PC = Src | — |
| 8 | 1 | 0 | 0 | 0 | Dest = Exec, DestE = 0, DestR = 0 | Dest = PC, DestE = 1 |
| 9 | 1 | 0 | 0 | 1 | Irrelevant | — |
| 10 | 1 | 0 | 1 | 0 | Dest = Src, DestE = 1, DestR = 0 | — |
| 11 | 1 | 0 | 1 | 1 | Irrelevant | — |
| 12 | 1 | 1 | 0 | 0 | Ignore - No change to machine state | — |
| 13 | 1 | 1 | 0 | 1 | Dest = Exec, DestE = 0, DestR = 1 | Dest = PC, DestE = 1 |
| 14 | 1 | 1 | 1 | 0 | Ignore - No change to machine state | — |
| 15 | 1 | 1 | 1 | 1 | Dest = Src, DestE = 1, DestR = 1 | |

Figure 3:
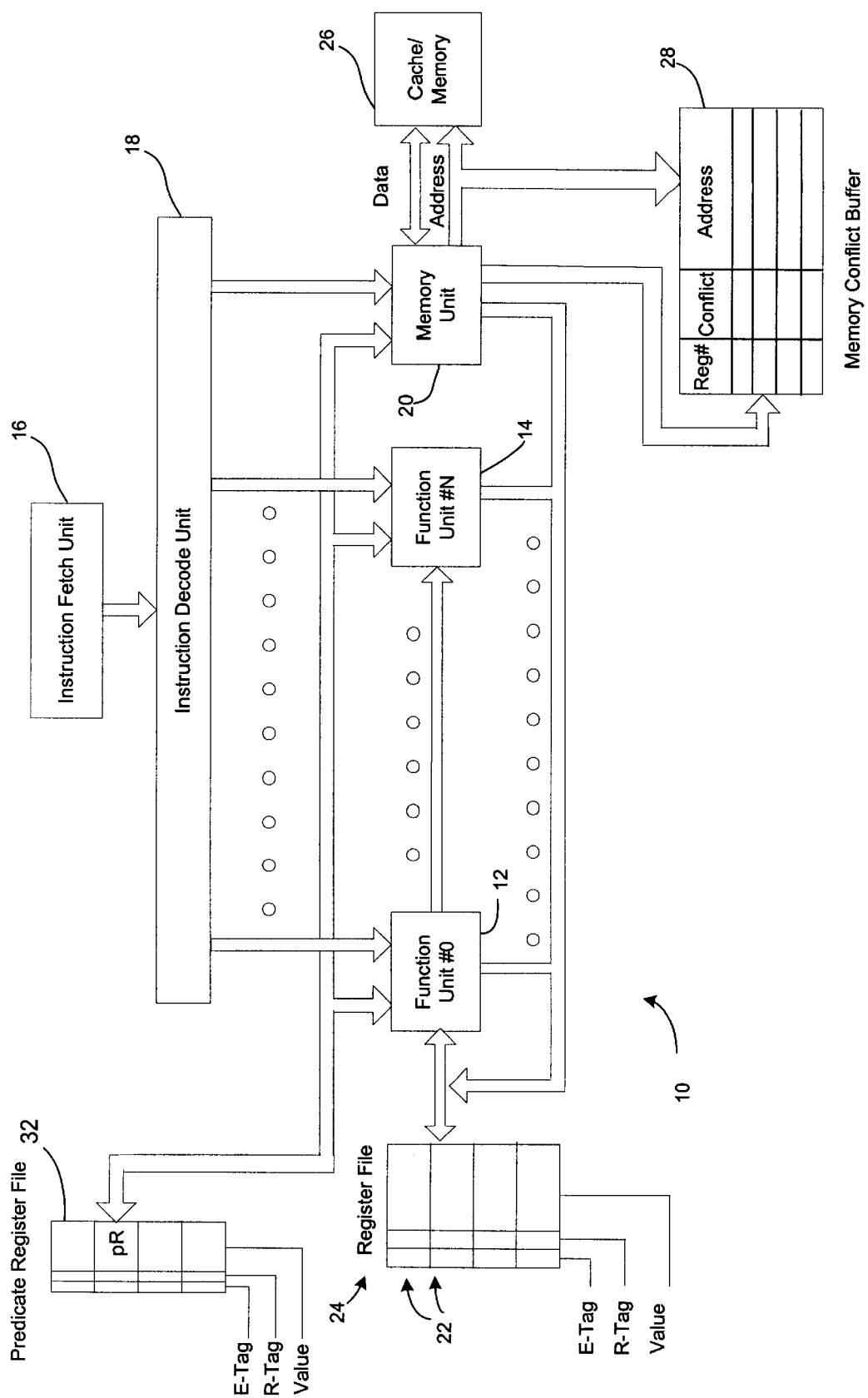
FIG. 3 is a schematic block diagram that illustrates another embodiment of a microprocessor architecture with which the invention may be implemented.

Turning now to FIG. 3, there is illustrated a predicated architecture similar to FIG. 1. The schematic block diagram of FIG. 3 depicts various components of a microprocessor architecture that provides additional support for predicated execution. This architecture is similar to the architecture of FIG. 1 in terms of the hardware components for performing multiple instruction issue. The major difference is that the predicated architecture is provided with a predicate register file 32 that accommodates 1-bit register data for each register index. In accordance with the aspect of inline recovery of the present invention, each register also includes an E-tag and R-tag, having the same intended functionality as previously mentioned. The block diagram of FIG. 3 represents, by way of example, a model of a different microarchitecture embodiment of the architecture of FIG. 1.

In this model of the architecture, the microarchitecture support for predicated execution provides several features that efficiently enable the mechanism of inline recovery. Most importantly is the principle of a predicated execution mechanism that selectively nullifies instructions within the processor pipeline. As this is similar to the inline recovery mode that selects a subset of instructions to execute, the underlying hardware mechanism of predication can feasibly be extended to include the control of inline recovery. In this model, the recovery mode can be implemented using a specially assigned predicate register within the predicate register file 32. The predicate can be used to indicate whether the currently executing instruction should be executed under normal semantics or recovery semantics.

Figure 4:
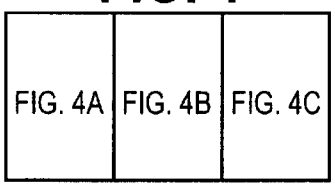
FIG. 4A is a first flow diagram that illustrates the process flow of another embodiment of the present invention.
FIG. 4B is a second flow diagram that illustrates the process flow of another embodiment of the present invention.
FIG. 4C is a third flow diagram that illustrates the process flow of another embodiment of the present invention.
Figure 4A:
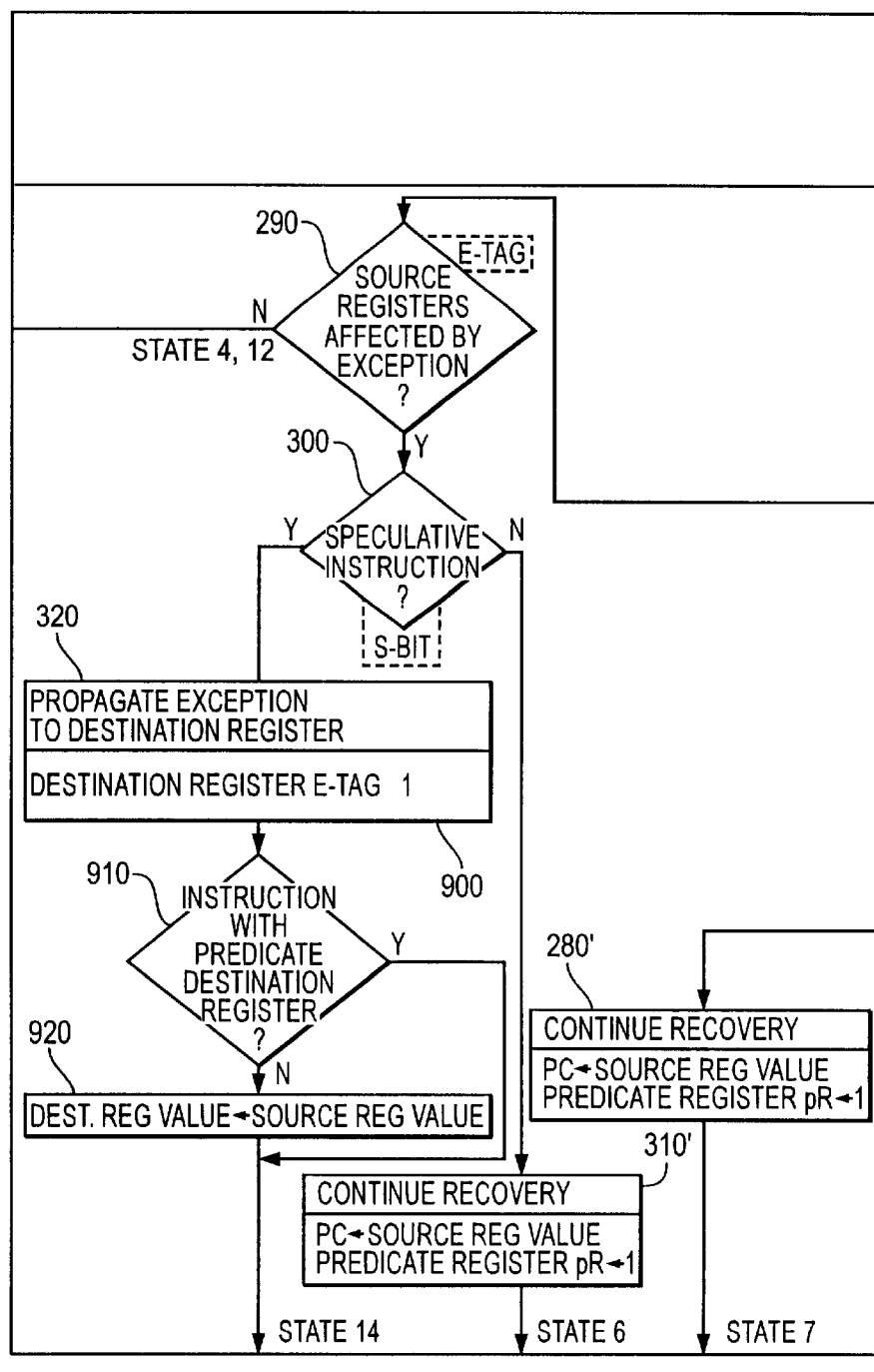
Figure 4B:
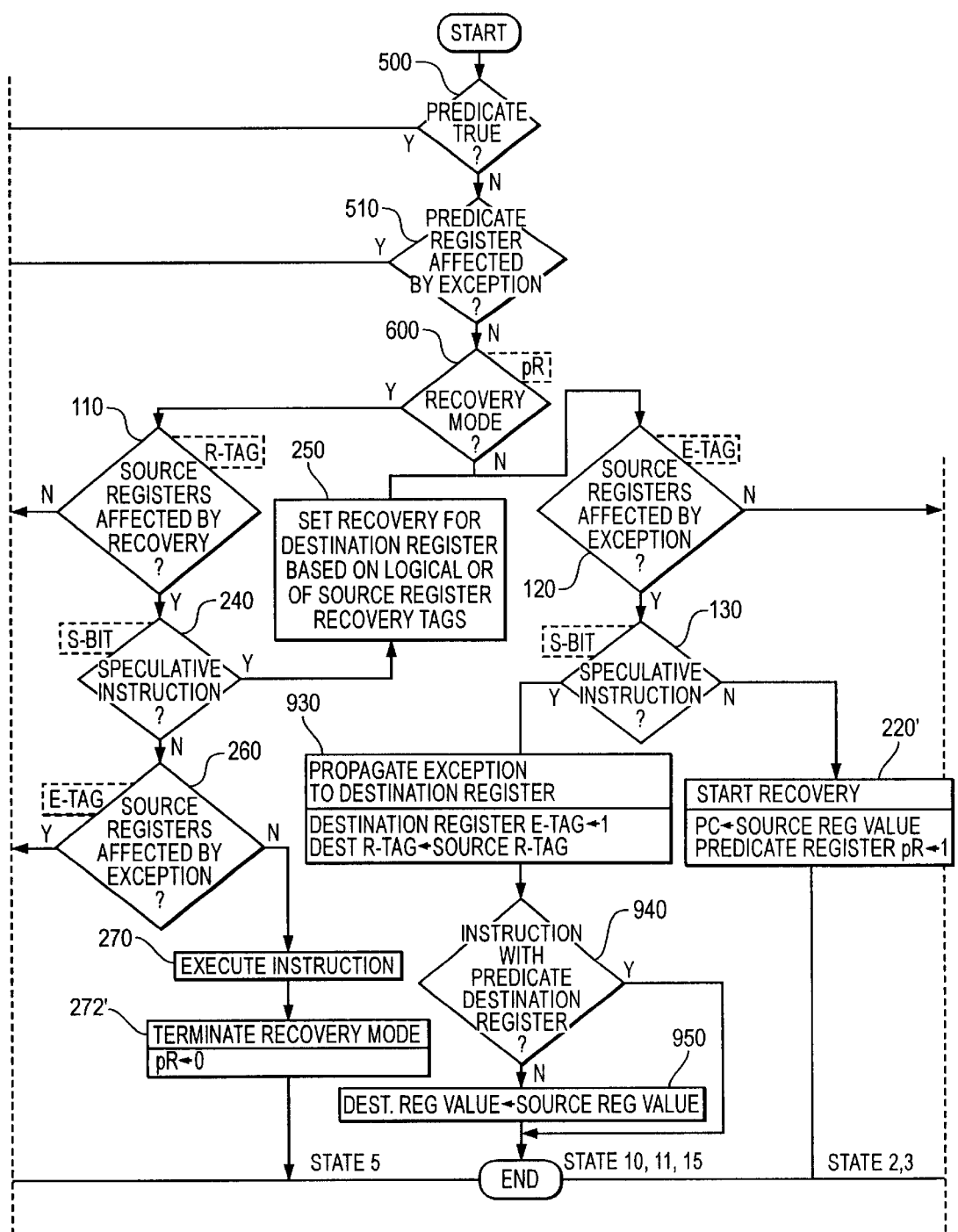
Figure 4C:
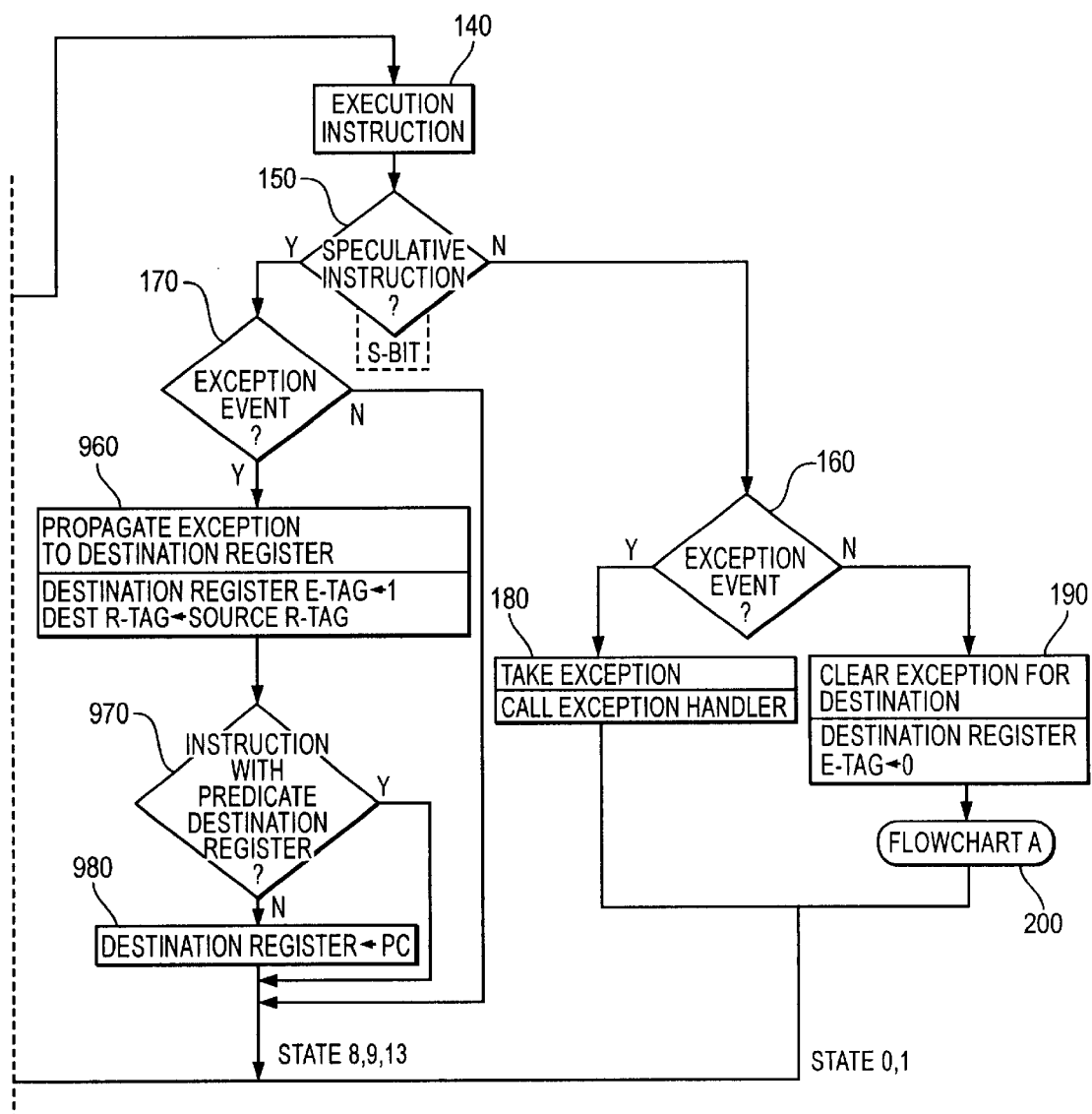

Turning now to FIGS. 4A-C, there are illustrated flow diagrams depicting the process of an instruction execution in connection with another embodiment of the invention the provides inline recovery where, in addition to control speculation and data speculation, predication is also implemented. Many of the steps of this flow diagrams are similar or identical to the steps of the non-predicated implementation illustrated in the flow diagrams of FIGS. 2A-B. The same step numbers are used for each step of the flow diagram of FIGS. 4A-C which are the same as the flow diagram of FIGS. 2A-B. Where the steps of FIGS. 4A-C are identical to the corresponding steps of FIGS. 2A-B, the step numbers are the same; where the steps are substantively different or additional, different step numbers have been provided in FIGS. 4A-C; and where the steps are similar but not identical, the step numbers of FIGS. 4A-C have been indicated with a prime indicator, such as for steps 220', 272', 280' and 310'. It should be noted that the steps illustrated in the flowchart of FIG. 2B are similar to those used as indicated by the branch to Flowchart A (step 200) of FIG. 4C, so reference to those steps is available by referring to the flowchart of FIG. 2B.

In the first step, step 500, it is determined whether the instruction being executed should perform the actual execution or computation as designated by the predicate value of its corresponding predicate register. If the predicate is TRUE or set to logical 1, the process continues to step 510. Otherwise, if in step 500 the predicate is FALSE or set to logical 0, the instruction does not perform any computation or change the state of the processor and execution of the current instruction is complete. In other words, the effect is essentially the same as executing a null instruction.

In step 510, it is determined whether the predicate register for the instruction is affected by an exception. This is accomplished by checking the E-tag of the predicate register. If the E-tag of the predicate register is set, then the instruction does not perform any computation or change the state of the processor. Otherwise, in step 510, if the E-tag of the predicate register is not set, the process continues to step 600, which corresponds to step 100 of the flow diagram of FIGS. 2A-B with only a few differences.

The remaining differences between the flow diagram of FIGS. 4A-C and FIGS. 2A-B can be explained by first noting that steps 210, 230, and 320 are the only steps that are modified in the predicated architecture of FIG. 5. For each of these steps, the predicate architecture can only update the destination register with the contents of the processor PC or a source register if the destination register is not a predicate register. Since predicate registers have only a 1-bit storage capacity, they are incapable of holding of processor program counter and cannot take part in the propagation of the program counter. Nevertheless the E-tag of the any register (predicate or conventional) can be set and propagated as dictated by the rules of FIG. 3.

In noting the differences of FIGS. 2A-B and FIGS. 4A-C, steps 210, 230, and 320, are renamed respectively as steps 900, 930, and 960. The difference between these respective steps, is that the steps of FIGS. 4A-C do not update the destination register with the source register value of the instruction PC. For the update of the destination register, different execution steps apply for any instruction that defines a predicate register since it cannot propagate the PC into it's destination register. Respectively, in steps 910, 940, and 970 of FIGS. 4A-C determine if the instruction has a destination operand capable of holding the PC of the excepting instruction. If the instruction in steps 910, 940 or 970 define predicate registers, then the instruction does not make any further change to the state of the processor. Otherwise in steps 910, 940, and 970, if the instruction does not define a predicate register, the process continues respectively to steps 920, 950, and 980, which update the destination register with the PC from either the source register with a set E-tag or the PC of the currently executing instruction.

As can be seen from the foregoing, the present invention provides an efficient mechanism for implementing inline recovery of exceptions which have been deferred during speculatively executed instructions. Associated with each of the registers is an indicator as to whether the register encountered an exception during speculative execution of an instruction. Such an indicator has been illustrated in the foregoing, merely by way of example, as an E-tag, an additional bit associated with each register. Also associated with each of the registers is an indicator as to whether the register is dependent upon an excepting instruction. Such an indicator has been illustrated in the foregoing, merely by way of example, as an R-tag, an additional bit associated with each register which is relied upon during the recovery process to determine is the instruction associated with that register should be involved in the recovery process. Thus, by use of such an exception indicator and a recovery indictor associated with the registers, unique, advantageous and efficient inline recovery may be performed in accordance with the present invention.

What is claimed is:

1. In a microprocessor system that supports non-speculative and speculative execution of instructions, a method for performing inline recovery for a first excepting speculative instruction where execution was deferred because a first exception event was encountered during speculative execution, said method comprising the steps of:

when said first exception event is encountered during speculative execution, storing information to indicate that said first exception event occurred and storing information relating to a program counter associated with said first excepting speculative instruction, for a subsequent speculative instruction that is data flow dependent upon said first excepting speculative instructions deferring execution of said subsequent speculative instruction, propagating and storing exception information for said first excepting speculative instruction in association with said subsequent speculative instruction, and for a subsequent non-speculative instruction that is data flow dependent upon said first excepting speculative instruction, performing an inline recovery process that re-executes speculatively those set of speculative instructions that are data flow dependent upon said first excepting instruction.

2. The method of claim 1 wherein the speculative execution of instructions includes control speculation, data speculation and predication.

3. The method of claim 1 further including the step of providing, for each of a plurality of registers associated with the microprocessor system, an E-tag for indicating that an exception occurred in the generation of the value stored in the register and an R-tag for indicating that the register is affected by a recovery operation.

4. The method of claim 1 further including the step of providing a memory conflict buffer to store information regarding memory conflicts that may have occurred as a result of a speculative execution of instructions.

5. The method of claim 1 further including a step:
when executing a speculative instruction, generating a transparent exception when, based upon predetermined criteria, deferring execution of the instruction is preferable.

6. In a microprocessor system that supports non-speculative and speculative execution of instructions, a method comprised of the steps of:
executing non-speculative instructions as they are fetched,
deferring execution of speculative instructions that encounter an exception event during speculative execution, and
performing inline recovery for at least one of said speculative instructions for which execution was deferred by re-executing said at least one speculative instruction and re-executing speculatively those speculative instructions that are data dependent upon said at least one speculative instruction.

7. The method of claim 2 wherein the speculative execution of instructions includes control speculation, data speculation and predication.

8. The method of claim 2 further including the step of providing, for each of a plurality of registers associated with the microprocessor system, an E-tag for indicating that an exception occurred in the generation of the value stored in the register and an R-tag for indicating that the register is affected by a recovery operation.

9. The method of claim 2 further including the step of providing a memory conflict buffer to store information regarding memory conflicts that may have occurred as a result of a speculative execution of instructions.

10. The method of claim 2 further including a step:
when executing a speculative instruction, generating a transparent exception when, based upon predetermined criteria, deferring execution of the instruction is preferable.

* * * * *